April 13, 1926.
H. C. EDDY
1,580,591
PROCESS OF DEHYDRATING OIL
Filed August 26, 1924
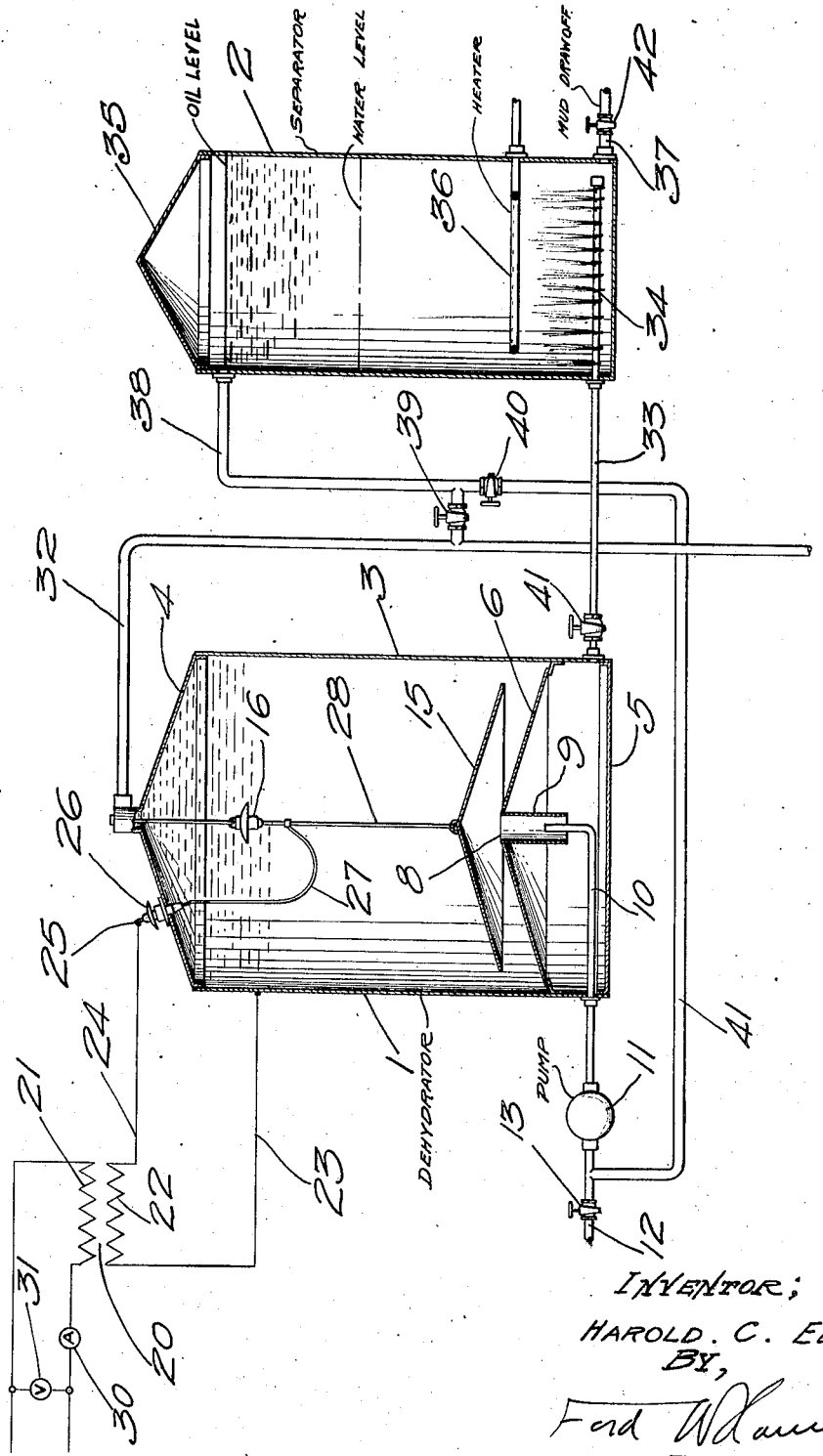
INVENTOR;
HAROLD. C. EDDY.
BY,
Ford W Davis
ATTORNEY.

Patented Apr. 13, 1926.

1,580,591

UNITED STATES PATENT OFFICE.

HAROLD C. EDDY, OF LOS ANGELES, CALIFORNIA, ASSIGNOR TO PETROLEUM RECTIFYING COMPANY OF CALIFORNIA, A CORPORATION OF CALIFORNIA.

PROCESS OF DEHYDRATING OIL.

Application filed August 26, 1924. Serial No. 734,235.

*To all whom it may concern:*

Be it known that I, HAROLD C. EDDY, a citizen of the United States, residing at Los Angeles, in the county of Los Angeles, State of California, have invented a new and useful Process of Dehydrating Oil, of which the following is a specification.

My invention relates to the art of separating petroleum oils from emulsions, in which the oils are associated with water and solid impurities.

Oil as found in the ground is often associated with ground waters or may be mixed therewith, either in the well or during the process of transportation or refining. Water as found in oil may be broadly classed either as free water, which will readily settle out by gravity if the emulsion is allowed to stand, or as trapped water, in which event the water is found in the oil in the form of minute particles which refuse to settle out even if the oil is allowed to stand for long periods. Various methods of breaking emulsions containing trapped water have been devised, the most successful being the electrical process in which the emulsion is brought between electrically charged electrodes, the electrostatic field so set up causing an agglomeration of the water into large drops which readily settle out, leaving the clean oil.

There is often found in the emulsion, in addition to the water, a considerable quantity of foreign matter, such as fine particles of sand or shale. This is particularly true in wells which have been drilled by the rotary method, as the hole is kept full of heavy mud during the drilling operation, this mud being often placed under considerable pressure. This rotary mud consists ordinarily of a fine clay of a colloidal nature, and during the drilling operations large quantities of this mud may be forced back into the oil sands. Whenever the well is put on production, this fine mud is gradually brought back into the well by the flow of the oil. I have found that this rotary mud is a great impediment to electrical dehydration, as the particles thereof tend to form chains in the electrostatic field, thus tending to short-circuit the field and reduce its efficiency.

It is an object of my invention to provide a process and apparatus by which oils containing large quantities of foreign and solid matter, such as rotary mud, can be readily and economically dehydrated.

Further objects and advantages will be made evident hereinafter.

The drawing, which is for illustrative purposes only, shows very diagrammatically an apparatus suited to carry on my invention.

The apparatus consists essentially of a dehydrator 1 and a separator 2. The dehydrator is of the standard electrical type now in wide use throughout the United States, and consists of a tank 3 having a tight top 4 and a tight bottom 5. Supported inside the tank and near the bottom thereof is a grounded electrode 6, this electrode being conical in form and preferably formed of sheet steel. Extending downwardly from an opening 8 in the center of the grounded electrode 6 is a vertical pipe 9, this pipe extending down to a point close to the bottom 5. An inlet pipe 10 projects upwardly inside the pipe 9, the pipe 10 not fitting tightly, however, into the pipe 9, there being a considerable open space around the pipe 10 inside the pipe 9. The pipe 10 is supplied with emulsion from a pump 11, this emulsion being drawn from suitable storage, not shown, through a pipe 12 having a valve 13.

Suspended over the grounded electrode 6 is a live electrode 15, this electrode 15 also being conical in shape. The electrode 15 is supported from a strain insulator 16, which in turn is supported from the top 4. The strain insulator 16 provides electrical insulation between the live electrode 15 and the tank 3. A potential is established between the grounded electrode 6 and the live electrode 15 by means of a transformer 20 having a primary 21 and a secondary 22. One terminal 23 of the secondary 22 is connected to the tank 3, the other terminal 24 being connected to a metal rod 25 passing through an insulator 26 mounted in the top of the tank. The insulator 26 serves to electrically insulate the rod 25 from the tank. The inner end of the rod 25 is connected through a flexible connection 27 with a member 28, which connects the live electrode 15 with the bottom of the strain insulator 16. The primary 21 of the transformer 20 may be connected to any suitable source of power and may be provided with an ammeter 30 and a voltmeter 31 for the purpose of observing the current and voltage applied to the transformer. In treating the average California petroleum oil, I utilize a potential of 11,000 volts between the live electrode 15 and the grounded electrode 6, this potential being set up by the secondary 22 of the transformer 20. A pipe 32 leads from near the top of the tank 3 and a pipe 33 leads from the bottom thereof. The pipe 33 is connected to a perforated pipe 34 which extends into the bottom of the separator 2.

The separator 2 is a tank which may have a top 35 if desired. Situated above the perforated pipe 34 in the separator 2 is a steam pipe 36, through which steam may be circulated from any convenient source for the purpose of heating the contents of the tank. A mud draw-off pipe 37 is provided at the bottom of the separator 2 and an oil outlet pipe 38 connects into the top thereof. The pipe 38 may be discharged through a valve 39 into the pipe 32, or through a valve 40 and a pipe 41, to the suction side of the pump 11.

The method of operation of my invention is as follows:

The treater 1 being filled with oil which has preferably been previously cleaned, and the separator 2 being filled with water, the plant is in condition to operate. Steam is first turned into the heating coil 36 and the water in the separator 2 is brought up to a temperature of from 125 to 210 degrees Fahrenheit, depending upon the character of the oil to be treated. This temperature can best be determined by trial on the actual oil, low temperature being first employed and these temperatures being increased in the event that a satisfactory separation is not obtained. The emulsion, which may contain water in a finely divided condition and perhaps considerable quantities of rotary mud or other solids, is forced by the pump 11 through the pipe 10 into the lower end of the pipe 9. The emulsion then passes upwardly through the pipe 9 and through the opening 8 into the space between the electrodes 6 and 15. In this space it is subjected to the action of the electrostatic field, the water particles tending to agglomerate into larger drops which settle downwardly against the grounded electrode 6, flowing downwardly thereover. The electrode 6 does not fit tightly inside the tank 3, so that the water and impurities settling thereon can readily fall into the bottom of the tank 3. The clean oil tends to rise to the top of the tank.

I have found that where large quantities of sand or rotary mud or other solid impurities are present in an emulsion, it is extremely difficult to maintain the electrostatic field, due to the tendency of this material to short-circuit the electrodes. I, therefore, find it necessary when treating oil of this kind to pass the emulsion very rapidly through the field at such a rate that a complete separation is not accomplished, the heavier portion of the emulsion which falls into the bottom of the tank containing a considerable percentage of oil.

I regulate the valve 41 in such a manner that there is a considerable flow of water, solid material and oil through the pipe 33 and through the perforated pipe 34, into the bottom of the separator 2. This mixture of oil, water and foreign material is forced outwardly through the perforations in the pipe 34 into the body of hot water contained in the separator 2. The oil, being considerably lighter than the water, tends to rise, flowing upwardly through the water in the form of fine particles or streams. The hot water acts upon these drops or streams, tending to separate the water and solid material from the oil, so that there gradually accumulates on the top of the separator 2 a body of oil, which in some cases is substantially water-free, and in other cases contains some water. The separated water and the mud containing the solid foreign material settles in the bottom of the separator 2 and may be drawn off continuously through the pipe 37 which is provided with a regulating valve 42. The supernatant material in the top of the separator 2 is drawn off through the pipe 38. If the oil treated is of such a character that this material is sufficiently free from water to be a commercial product, it may be passed through the valve 39 and mixed with the clean oil from the pipe 32.

In some cases, however, it is desirable to operate the plant at such a rate that the material flowing outwardly from the separator 2 through the pipe 38 is not a commercial product, but still contains considerable quantities of water or solid impurities. In this event the valve 39 may be closed and the valve 40 opened, and the supernatant material from the separator 2 may be passed to the pump 11, being forced with the raw oil into the tank filled for retreatment.

I have found that by the use of the above described process, I am able to treat materials which have previously resisted electric treatment, and to also treat many materials which have heretofore been considered waste, due to the fact that they could not be treated. I am also able, operating on many types of oils, to greatly increase the capacity of the electrical dehydrator, due to the fact that it is not necessary to produce a complete separation of oil from its impurities therein, the separator 2 relieving the dehydrator of a great deal of this work.

In some cases I have been able to increase the capacity of the dehydrator, by the addition of the separator, at least three or four times without reducing the quality of the oil delivered through the pipe 32.

In the operation of the dehydrator shown, the incoming emulsion is treated in the electric field between the electrodes 15 and 6, so that the water particles agglomerate into larger masses in which a considerable portion of the solid material is trapped. The water and solid material settles into the bottom of the treater, and the cleaned oil rises to the top. During the successful operation of the treater, there is a marked stratification therein. In the extreme bottom there is a layer of water which contains solid impurities and a small percentage of oil. In the extreme top there is a layer of oil which contains a small percentage of water. Between these two layers there is a layer of heavy emulsion in the process of settling. It is necessary that this layer of heavy emulsion be kept below the electrode 15, as it is a good conductor of electricity and will short-circuit and destroy the electric field if allowed to rise to the electrode 15.

I claim as my invention:

1. A process of separating water and solid impurities from an oil emulsion which comprises: treating the emulsion to agglomerate the fine water particles therein; allowing the resulting liquid to stratify; removing the driest portion of said liquid; passing a wetter portion through a water bath to wash out the water and suspended impurities therefrom; and removing the supernatant oil from said water bath.

2. A process of separating water and solid impurities from an oil emulsion which comprises: treating the emulsion to agglomerate the fine water particles therein; allowing the resulting liquid to stratify; removing the driest portion of said liquid; passing a wetter portion through a water bath to wash out the water and suspended impurities therefrom; removing the supernatant oil from said water bath; and passing said partially dehydrated oil into the oil removed from the drier portion of said emulsion.

3. A process of separating water and solid impurities from an oil emulsion which comprises: treating the emulsion to agglomerate the fine water particles therein; allowing the resulting liquid to stratify; removing the driest portion of said liquid; passing a wetter portion through a water bath to wash out the water and suspended impurities therefrom; removing the supernatant oil from said water bath; and passing said partially dehydrated oil back into the stratifying emulsion.

4. A process of separating water and solid impurities from an oil emulsion which comprises: subjecting the drier portion of said emulsion to the action of an electric field for the purpose of agglomerating the water and accelerating the stratification; removing cleaned oil from the upper portion of the stratifying mass; passing a wetter portion through a water bath to wash out the water and suspended impurities therefrom; and removing the supernatant oil from said water bath.

5. A process of separating water and solid impurities from an oil emulsion which comprises: subjecting the drier portion of said emulsion to the action of an electric field for the purpose of agglomerating the water and accelerating the stratification; removing cleaned oil from the upper portion of the stratifying mass; passing a wetter portion through a water bath to wash out the water and suspended impurities therefrom; removing the supernatant oil from said water bath; and passing said partially dehydrated oil into the oil removed from the drier portion of said emulsion.

6. A process of separating water and solid impurities from an oil emulsion which comprises: subjecting the drier portion of said emulsion to the action of an electric field for the purpose of agglomerating the water and accelerating the stratification; removing cleaned oil from the upper portion of the stratifying mass; passing a wetter portion through a water bath to wash out the water and suspended impurities therefrom; removing the supernatant oil from said water bath; and passing said partially dehydrated oil back into the stratifying emulsion.

In testimony whereof, I have hereunto set my hand at Los Angeles, California, this 20th day of August, 1924.

HAROLD C. EDDY.